Sept. 17, 1963    LE ROY F. RAMER    3,104,009
PORTABLE BELT CONVEYOR MECHANISMS Filed April 18, 1960    5 Sheets-Sheet 1

LE ROY F. RAMER
*INVENTOR.*

BY *James R. Head*

ATTORNEY

Sept. 17, 1963 LE ROY F. RAMER 3,104,009
PORTABLE BELT CONVEYOR MECHANISMS
Filed April 18, 1960 5 Sheets-Sheet 3
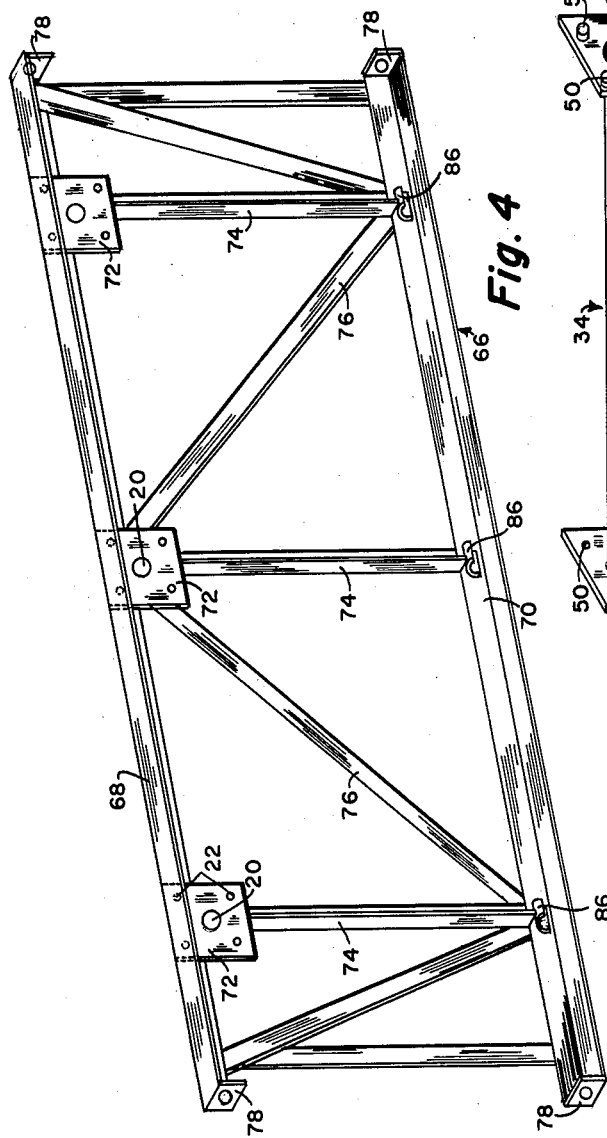
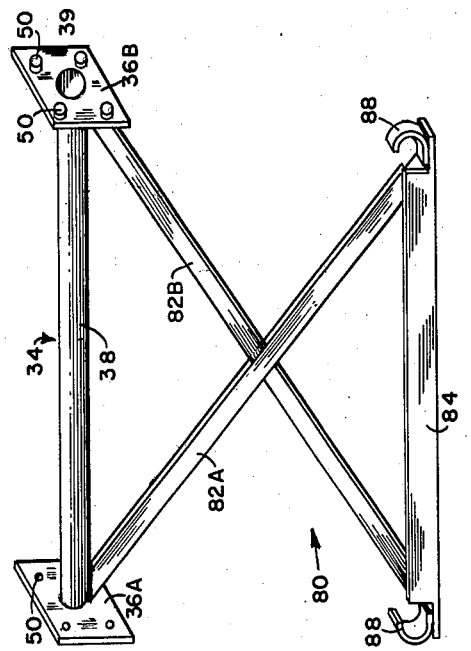
LE ROY F. RAMER
INVENTOR.

LeRoy F. Ramer
INVENTOR.

BY James R. Head
ATTORNEY

Sept. 17, 1963 LE ROY F. RAMER 3,104,009
PORTABLE BELT CONVEYOR MECHANISMS
Filed April 18, 1960 5 Sheets-Sheet 5

LE ROY F. RAMER
INVENTOR.

BY *James R. Head*

ATTORNEY

United States Patent Office 3,104,009
Patented Sept. 17, 1963

3,104,009
PORTABLE BELT CONVEYOR MECHANISMS
Le Roy F. Ramer, Tulsa, Okla.
Filed Apr. 18, 1960, Ser. No. 22,872
13 Claims. (Cl. 198—204)

This invention relates to a portable conveyor system. More particularly the invention relates to improvements in belt conveyor systems whereby they may be more quickly assembled and disassembled.

Belt conveyors have long been used in industry as an economical and expedient means of conveying raw materials. In permanent installations, such as in manufacturing establishments, the structure which is used to support the belts can be permanently erected using ordinary engineering techniques wherein the structure is welded or bolted together. Many instances occur, however, when it is desirable to use belt conveying systems of only a temporary nature. Such instances occur in erecting and dismantling buildings, constructing dams and roadways, and in the mining industry.

When a belt conveyor system is to be erected for use over a period of only a few days, or a few weeks, present construction techniques are such that the expense often times becomes prohibitive. In most instances the structures are required to be engineered and fabricated for one installation. They have little reusable or salvage value when the conveyor system is required on a new job site.

It is an object of this invention to provide a demountable and portable conveying system which can be easily erected with a minimum of tools and equipment.

Another object of this invention is to provide a channel type structure for supporting belt conveying equipment including means of supporting the channel members together to form a truss, wherein the supporting means are readily detachable.

Another object of this invention is to provide a clip means for detachably fixing belt idlers to the supporting members.

Another object of this invention is to provide a means of supporting truss members together which can be assembled or disassembled without requiring welding, or the use of wrenches.

Another object of this invention is to provide a demountable truss structure which may be easily erected in the field with a minimum number of tools.

Another object of this invention is to provide a readily demountable truss system capable of spanning long distances and supporting increase weights which may be easily dismounted.

Another object of this invention is to provide a demountable conveyor belt support system which may be easily disassembled, and when disassembled, can be compactly arranged for hauling and shipping.

Another object of this invention is to provide a supporting member for conveyor belt idlers which will be less expensive to manufacture and easier to assemble than existing conveyor belt support devices.

These and other objects and a better understanding of this invention may be had by referring to the following description and claims, taken in conjunction with the attached drawings in which:

FIGURE 4 is an isometric view of a truss side panel, an alternate embodiment of this invention, which constitutes one element in a demountable truss for spanning greater distances or supporting greater weights.

FIGURE 5 is an isometric view of a demountable spacer member used in conjunction with truss side panels of FIGURE 4 to form an integrated truss structure for spanning a greater distance and supporting greater weights.

Figure 1:
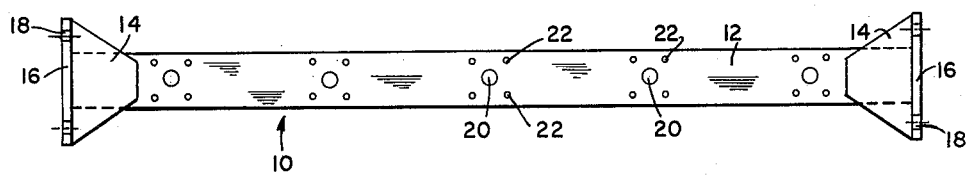
FIGURE 1 is a side view of a channel member showing the openings used for fixing two of said members together to form a simple truss and showing means on the ends of the channel members for coupling the channels in sequence.

Referring now to the drawings, and first to FIGURE 1, a channel truss section, indicated generally by 10, is shown. In practice this will be an element used in the assembly of a demountable conveyor belt support. The length of channel truss section 10 will ordinarily be not greater than would constitute a weight which one man could easily handle in assembling the conveyor system.

A steel channel member 10 is provided with gusset plates 14, bolted or welded to each end. Gusset plates 14 have integrally formed perpendicular portions 16, with holes 18, so that channel truss sections 10 may be bolted end-to-end to provide a belt conveying system of the length required. This is one means of assembling channel truss sections 10, and easily demountable means will be described later.

Evenly spaced along channel member 12 are spacer openings 20, surrounded by smaller openings 22. Openings 20 and 22 are used in this invention as a means of supporting two of the channel truss sections 10 in a parallel assembly to form an easily dismountable and integrated conveyor belt support.

Figure 2:
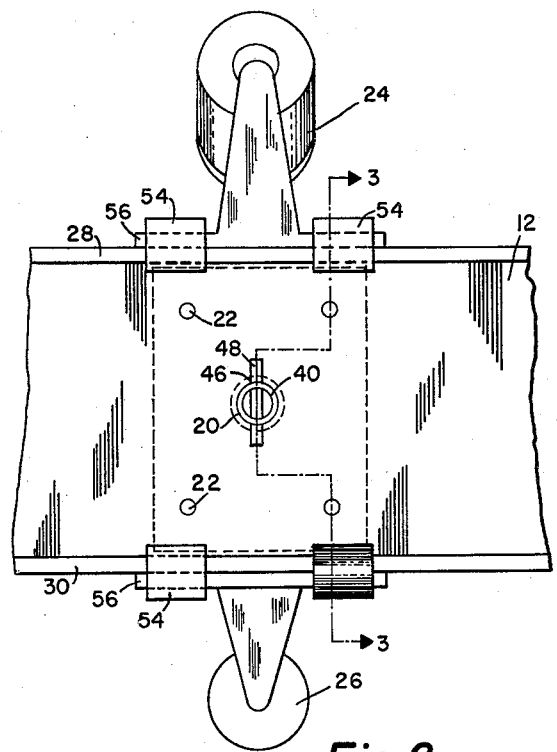
FIGURE 2 is a side view of the channel of FIGURE 1 showing means whereby the upper and lower belt idlers are fixed to the channel and showing means whereby two channels are supported together to form a conveyor belt support.

Referring to FIGURE 2 the means whereby the channel truss sections 10 are used as a support for a conveyor belt is shown. Channel 12 has upper idlers 24 and lower or return idlers 26 supported thereon.

Figure 3:
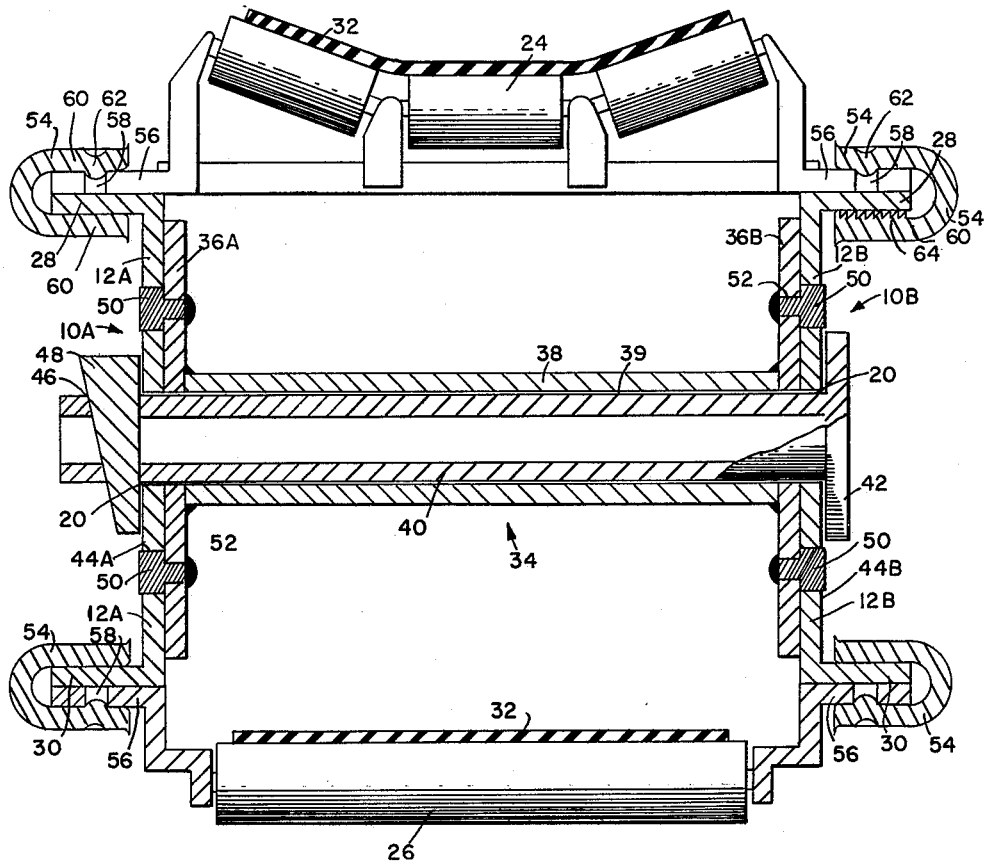
FIGURE 3 is a cross-sectional view taken along the line 3—3 of FIGURE 2 showing in greater detail the novel means of this invention whereby two channel members are supported in a spaced relationship with each other to provide a truss for supporting upper and lower conveyor belt idlers.

The means whereby two channel truss sections 10 are supported together to form a support for a conveyor belt system is best disclosed in FIGURE 3. Two channel truss sections 10 are supported in a spaced relationship with respect to each other to form a length of conveyor belt support. Although the channel truss sections 10 are of identical construction so that they may be interchangeably used for description purposes, the one on the left will be termed channel truss section 10A, and the one on the right, channel truss section 10B. Channel truss sections 10A and 10B are constructed of channel members 12A and 12B. Affixed to the upper channel flanges 28 are the upper idlers 24 (only one is shown) which are usually of a trough shaped configuration. Supported to the bottom channel flanges 30 are the return idlers 26 (only one is shown) which are usually of a flat construction designed to carry the conveyor belt 32 on its return path. To form a base for belt idlers 24 and 26, channels 12A and 12B must be supported firmly together in a proper spaced relationship. This is accomplished in an ingenious way whereby channels 12A and 12B may be quickly and easily assembled or disassembled in the field, with the use of a minimum number of tools. A channel spacer, indicated generally by the numeral 34, is inserted between channels 12A and 12B. Channel spacer 34 consists of vertical plates 36A and 36B welded to a tubular spacer member 38. Channel spacers 34 are positioned between channels 12A and 12B to that the cylindrical opening 39 of channel spacer members 38 aligns with spacer openings 20 in channel members 12A and 12B.

A cylindrical fastener member 40 is inserted through spacer openings 20 of channels 12A and 12B and through the cylindrical opening 39 of tubular spacer member 38. Formed on one end of cylindrical fastener member 40 is a vertical flange 42 which engages the web 44 of channel 12B. Formed in the opposite end of cylindrical fastener member 40 is a wedge shaped opening 46. Positioned in the wedge shaped opening 46 is a retaining wedge 48, engaging web portion 44A of channel member 12A.

The assembly of the portable conveyor belt support of this invention is accomplished as follows. Channel truss sections 10A and 10B are placed parallel to each other. Channel spacer members 34 are placed therebetween. Cylindrical fastener members 40 are inserted through the spacer openings 20 of channel member 12B, extending through spacer openings 20 of channel member 12A. Wedge 48 is placed into wedge shaped opening 46, and tapped in position with a hammer. Vertical flange 42 is pulled against web portion 44B of channel 12B as wedge 48 engages web portion 44A of flange 12A. In this manner, only a hammer is required as a tool to assemble a supporting mechanism for a portable belt conveyor.

In assembling the channel spacer 34 between channel members 12A and 12B it is important that the tubular opening 39 of tubular spacer member 38 align properly with spacer openings 20 in the web portions 44A and 44B of channel members 12A and 12B. To assure this proper alignment, studs 50 are provided on vertical plates 36A and 36B. Studs 50 coincide with smaller openings 22 in the web portions 44A and 44B so that when studs 50 are positioned in smaller openings 22 proper alignment of channel spacers 34 will be achieved.

Studs 50 are affixed to plates 36A and 36B by boring holes 52 in plates 36A and 36B, inserting studs 50 into holes 52, and welding the stud 50 to plates 36A and 36B. The portion of the stud 50 extending through smaller holes 22 of channel members 12A and 12B may be enlarged, as shown in FIGURE 3, to provide increased support.

It can be seen that studs 50 could be formed or welded on channel members 12A and 12B to protrude through holes 52 in plates 36A and 36B, and the same function will be achieved. It can also be seen that studs 50 are not a requirement for the formation of a rigid dismountable conveyor belt support system and that alignment of tubular opening 39 of tubular spacer member 38 could be achieved by other means.

Channel spacers 34 have been described incorporating tubular spacer members 38 and cylindrical fastener members 40. This is by way of example only and channel spacers 34 may be of other geometrical configurations. For instance, tubular spacer members 38 could be of a hollow, square cross-sectional, configuration to receive fastener members 40 of a square cross-sectional configuration. The disclosed embodiment, although deemed the optimum arrangement, is by way of example only. Channel members 12A and 12B, are also shown by way of example only. Other structural configurations, such as H-beams, will serve satisfactorily.

The present practice in the assembly of conveyor belt structures for the handling of materials requires the upper and return idlers 24 and 26 to be bolted to the supporting members. This of course is time consuming and reduces the adaptability of belt conveying as a temporary means of material handling. An important aspect of this invention is to provide a means whereby the idlers 24 and 26 may be attached to the supporting mechanism quickly, with the use of a minimum variety of tools, and yet in a secure way whereby the conveyor mechanism, when assembled, will be trouble-free. This is accomplished by the use of retaining clips 54. Retaining clip 54 is of a U-shaped configuration and is formed of a resilient metal having a degree of spring so that when spread apart there will be a tendency to return to the original shape. Belt idlers 24 and 26 are ordinarily equipped with mounting flanges 56, having at least one bolt hole 58 formed therein for use in bolting the idlers 24 and 26 to the supporting members. Retainer clips 54 are formed with parallel wings 60. Formed in one of the wings 60 on each retaining clip 54 is a dent 62. Dent 62 may be easily formed by heating a spot on one wing 60 of retaining clip 54 to a temperature whereby the metal in the area where the heat is being applied becomes plastic. A punch is placed in position on the heated spot and a blow is struck against the punch so that dent 62 is integrally formed in one wing 60 of the retaining clip 54.

To fasten belt idlers 24 and 26 to the supporting mechanism previously described, they are placed in position so that mounting flanges 56 are in contact with channel flanges 28 and 30. Retaining clips 54 are positioned to force the channel flange 28 and mounting flange 56 together and are hammered in position so that dent 62 rests in bolt hole 58. In this manner idlers 24 and 26 can be quickly applied using only a hammer and the relatively slow process of inserting bolts and tightening nuts to hold the idlers 24 and 26 in place is eliminated. Retaining clip 54, when in position, cannot be loosened due to the retention exerted by dent 62 in bolt hole 58. When it is necessary to remove retaining clip 54, in dismantling the portable conveying system of this invention, retaining clips 54 may be pried loose quickly and easily with a tool such as a crowbar.

To make certain that the retaining clips 54 cannot slip from engagement with channel flanges 28 and mounting flanges 56, an alternate embodiment of this element of the invention includes the provision of a toothed surface 64 on one wing 60 of the retaining clip 54. The toothed surface 64 may be used in conjunction with dent 62, wherein the dent 62 is placed on one wing 60 and the toothed surface 64 is placed on the other wing 60, to provide a retaining clip 54 having maximum assurance that it cannot unintentionally dislodge from its proper position. Toothed surface 64 may also be used alone as means of retaining clip 54 in position without the conjunctive use of dent 62.

The quickly assembled portable belt conveying system as described in FIGURES 1, 2 and 3 has a great many advantages over existing types of conveying systems. First, it can be quickly assembled using only a hammer—no wrenches are required to place flanges 12A and 12B in a supported relationship with each other, nor to fasten belt idlers 24 and 26 to the assembled belt supporting system. The disassembly of the conveyor belt mechanism can be accomplished with equal expediency. By the use of the principles of this invention it is economically feasible to set up conveyor belt systems for only a few hours' use, whereas under the present means of constructing the systems only use over an extended period of time justifies the high erection and dismantling expenses.

Figure 6:
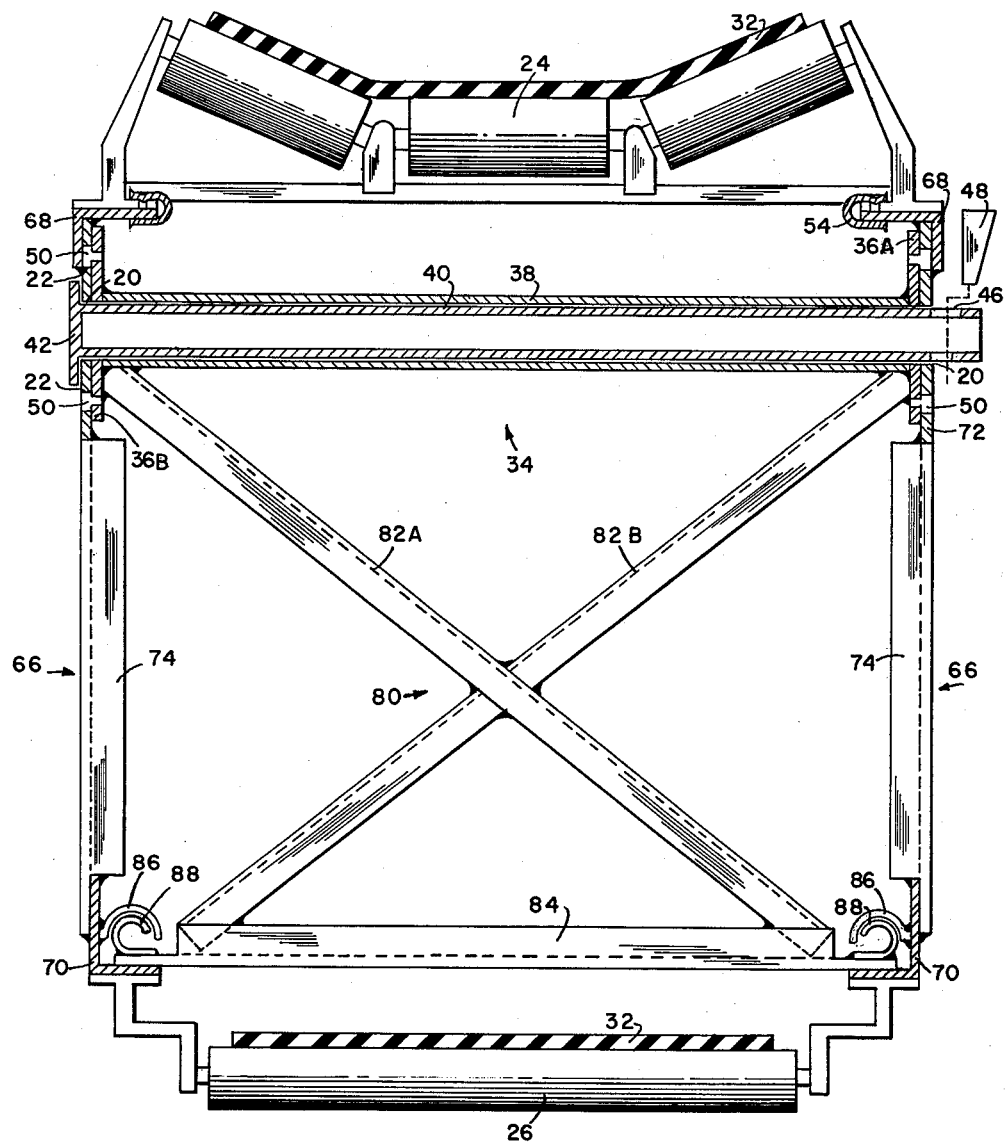
FIGURE 6 is a cross-sectional view of a completely assembled conveyor belt support structure.
Figure 7:
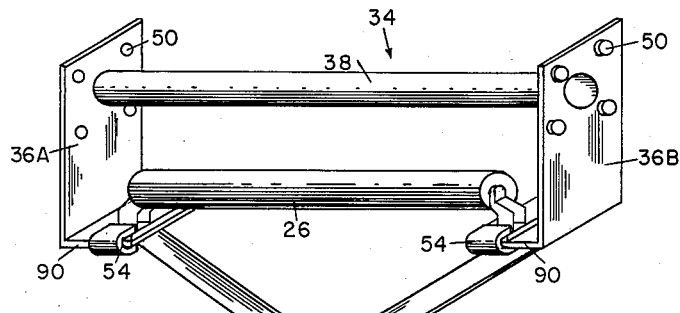
FIGURE 7 is an isometric view of an alternate form of the demountable spacer member having return idler supports and showing the position of a return idler.

The system of this invention described in FIGURES 1, 2 and 3 incorporates the use of channel truss sections 10 as the load supporting structures. This system is ideal when the distances to be spanned are not long and when weights to be transported are light. When greater lengths must be traversed by the conveyor belt system a supporting means is required having greater load bearing potential. FIGURES 4, 5 and 6 disclose an alternate conveyor belt supporting system which can be easily assembled and disassembled and which is adaptable for spanning greater distances.

FIGURE 4 is an isometric view of a truss side panel, indicated generally by the numeral 66. Truss side panels 66 serve the equivalent function of channel truss sections 10 of FIGURE 1, that is, two of these truss side panels 66 are supported together to make a section of a conveyor belt support.

Truss side panels 66 are fabricated of an upper angle member 68 and a lower angle member 70. Welded, or otherwise affixed, to upper angle 68 in a spaced relationship to each other, are support plates 72. A spacer opening 20 and a multiplicity of smaller openings 22 are formed in each support plate 72 to serve to same function as openings 20 and 22 in the web 44 of channel member 12, as shown in FIGURE 1. Upright angles 74 extend from support plates 72 down to lower angle member 70. Truss angle members 72 are welded to lower angle member 70 and extend to be welded to support plates 72. End plates 78 are provided at each end of both the upper and lower angles members 68 and 70 providing one means whereby succeeding truss side panels 66 may be bolted in series to achieve the length desired for the conveyor belt system.

To form an integrated truss section for supporting a conveyor belt, two truss side panels 66 must be supported together, in the same way that two channel truss sections 10 were supported together in FIGURE 3. Integrally formed demountable spacer members, indicated generally by the numeral 80, are provided as a means of accomplishing this, and are shown in FIGURE 5. The demountable spacer members 80 consist essentially of the channel spacers 34 as described in FIGURE 3, with additional bracing required to adapt them for use with truss side panels 66. Diagonal braces 82A and 82B are provided of structural angle iron and are each welded at one end at the juncture of tubular spacer member 38 with vertical plates 36A and 36B. A bottom brace 84, paralleling tubular spacer member 38, is welded to the lower portions of diagonal braces 82A and 82B. Cylindrical spacer member 38 has a cylindrical opening 39, and vertical plates 36A and 36B are equipped with studs 50, in the same manner as described in FIGURE 3. Welded to lower angle 70 of truss side panels 66 at the point where juncture is made by upright angles 74, are truss hooks 86. Mating spacer hooks 88 are welded to bottom braces 84.

A section of conveyor belt support is erected by positioning two or more channel spacer members 34 between parallel truss side panels 66.

FIGURE 6 is a cross-sectional view taken perpendicular to the length of truss side panels 66 showing an assembled section of conveyor belt supporting mechanism. Truss side panels 66 are supported in a spaced relationship by positioning between support plate 72 channel spacer members. Studs 50 in plates 36A and 36B engage smaller openings 22 in support plates 72 to center the cylindrical opening 39 of tubular spacer member 38 with spacer openings 20 in support plates 72. Cylindrical fastener members 40 are inserted through spacer openings 20 in support plates 72 and through tubular opening 39 of tubular spacer members 38 so that vertical flanges 42 engage support plates 72. Wedges 48 are then inserted into the wedge shaped openings 46 of the cylindrical fastening members 40 so that the two truss side panels 66 are firmly assembled into a uniform, integral conveyor belt supporting section.

Spacer hooks 88 affixed to bottom brace 84 interlock with truss hooks 86 affixed to lower angle 70. Truss hooks 86 and space hooks 88 are slidably engaged with each other in a manner to quickly permit the assembly of a conveyor belt support section.

Upper belt idlers 24 are affixed to upper angle members 68, as with retaining clips 54 previously described. In like manner return idlers 26 are affixed to lower angle members 70.

A truss section can be completed in a few minutes in the field, using only a hammer, by assembling two truss side panels 66, at least two truss spacer members 80, cylindrical fastening member 40 for each truss spacer member 34 and a wedge 48 for each cylindrical fastening member 40. The only tool required is a hammer to drive wedge 48 securely in wedge shaped opening 46. Disassembly can be accomplished just as easily requiring only a few minutes' time. Successive lengths of these assembled conveyor belt supporting sections can be united together by inserting bolts (not shown) through end plates 78, so that the desired length can be obtained for the conveying system.

As has been previously pointed out, the use of the terms "tubular" and "cylindrical" is by way of example only, and other geometrical configurations will apply equally as well.

Figure 8:
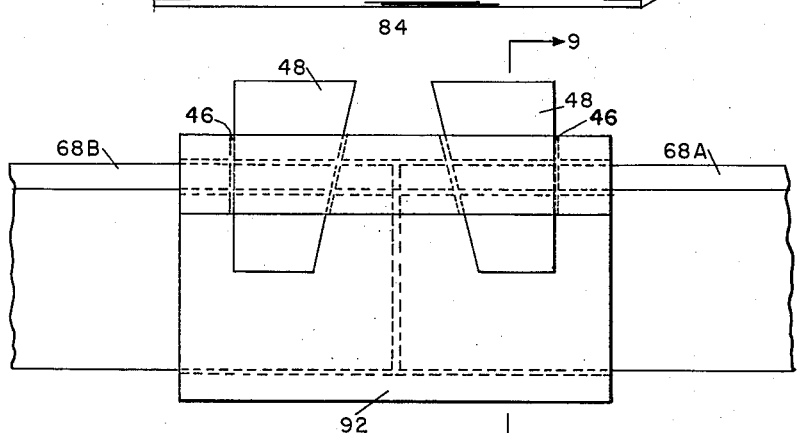
FIGURE 8 is a side view of a method whereby upper and lower angle portions of the truss side panels may be demountably affixed to succeeding truss side panels to extend the length of the belt conveyor support.

The assembled conveyor belt support section shown in FIGURE 6 requires the return idler 26 to be placed on the bottom of the structure. An alternate arrangement of truss spacer members 80 is shown in FIGURE 8 permitting the return idlers 26 to be placed in more desirable positions. Vertical plates 36A and 36B, having return idler supports 90 integrally formed thereon, are provided. Return idlers 26 mount on these return idler supports 90. Diagonal braces 82A and 82B are welded to the lower surfaces of return idler supports 90.

Figure 9:
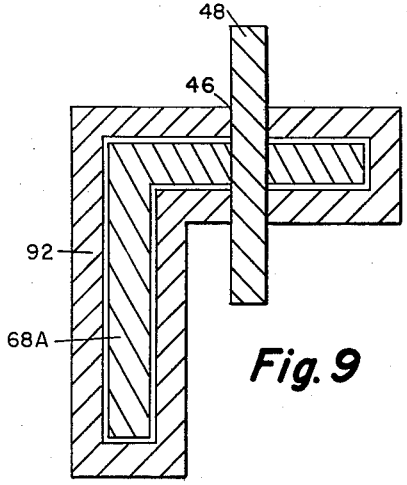
FIGURE 9 is a cross-sectional view taken along the line 9—9 of FIGURE 8.

Means are shown for coupling together successive conveyor belt support sections for achieving the desired length for the conveyor systems, such as the gusset plates 14 of FIGURE 1, and end plates 78 of FIGURE 4. An alternate means of coupling successive conveyor belt support sections together is shown in FIGURES 8 and 9. A hollow angle coupling member 92 is provided having an internal configuration substantially equal to the configuration of upper angle member 68A. Wedge shaped openings 46 are provided in angle coupling member 92 and in upper angle members 68A and 68B. To couple two successive conveyor belt sections together angle members 68A and 68B are positioned within angle coupling member 92 and wedges 48 are tapped into wedge shaped openings 46. The same procedure is followed for both upper angle members 68 and both lower angle members 70 to completely unite adjoining sections. A different configuration of the same principle of angle coupling member 92 can be used to join successive channel members 12 together. An alternate arrangement incorporates welding the angle coupling member 92 to one upper angle member 68A wherein only one wedge 48 is required, that for upper angle member 68B. By using the principles of this invention portable conveyor belt systems can be quickly erected or dismantled making possible the adaptation of the conveyor belt method for transporting material in many instances where it was not previously economically feasible. If only short distances are to be spanned the channel truss sections of FIGURES 1, 2, and 3 may be used. If greater distances must be traversed and heavier loads supported, then the more rigid configuration of the alternate embodiment of the invention as disclosed in FIGURES 4, 5, and 6 may be used. Either system can be assembled and disassembled with minimum time, labor and tools. Although this invention has been described with a certain degree of particularity, it is manifest that many changes may be made in the details of construction and the configuration of the components without departing from the spirit and the scope of this disclosure. As one example of alterations which may be made, this disclosure has been made using structural angular portions predominately whereas it can be seen that tubular structural members would be equally adaptable. This disclosure has been made by way of example only, and such disclosure is not intended to constitute a limitation of the invention which is delineated in the appended claims.

I claim:

1. A demountable conveyor support adaptable for supporting a multiplicity of upper and lower belt idlers comprising, in combination; a first and second channel member, said channel members comprising vertical web portions having flange portions integrally formed perpendicular thereto, said channel members positioned in a spaced relationship whereby said web portions are substantially parallel to each other; demountable spacer means positioned between said web portions of said first and second channel members in a spaced relationship along the length of said channel members; means of demountably securing said spacer means in firm engagement with said web portions of said channel members; and means of demountably affixing said upper belt idlers and said lower belt idlers to said flange portions of said channel members.

2. A demountable conveyor belt support adaptable for supporting a multiplicity of upper and lower belt idlers comprising, in combination; a first and a second channel member, said channel members each having a vertical web portion and flange portions integrally formed perpendicularly thereto, said channel members positioned in a spaced relationship whereby said web portions are substantially parallel to each other, said web portions having spacer openings therein in spaced relationship along the length of said channel members; demountable spacer members positioned between said web portion of said first and second channel members, said spacer member having openings therein disposed to align with said spacer openings in said web portions of said channel members; fastener members inserted in said aligned openings of said web portions and said spacer members; means on the ends of said fastener members whereby said channel members are drawn firmly against said spacer members; and means of demountably affixing said upper belt idlers and lower belt idlers to said flange portions of said channel members.

3. A demountable conveyor belt support according to claim 2 wherein said spacer member comprises a horizontal tubular member; a vertical plate member affixed to each end of said tubular member disposed to engage said web portion of said channel members, each of said plate members having a plate spacer opening therein of substantially equal size to and aligned with tubular opening of said tubular members.

4. A demountable conveyor belt support according to claim 3 wherein web portions of said channel members have at least one opening therein in a spaced relation adjacent each of said spacer openings and wherein each of said plate members has at least one stud affixed thereto and protruding therefrom in a spaced relationship adjacent said plate spacer opening whereby said studs are disposed to engage said opening in said web portions to align said plate spacer openings with said web portion spacer openings.

5. A demountable conveyor belt support according to claim 3 wherein said fastener member includes a cylindrical member disposed to enter said aligned spacer openings in said web portion and said tubular openings of said spacer members; a vertical flange affixed to one end of said cylindrical member disposed to engage said web portion of one of said channel members, the other end of said cylindrical member having a wedge shaped slot in the plane of the cylindrical axis of said cylindrical member; and a wedge member disposed to enter said wedge shaped slot and to engage said web portion of the other of said channel members.

6. A demountable conveyor belt support according to claim 2 including means affixed to one end of each of said channel members whereby succeeding channel members may be demountably affixed thereto whereby length of said conveyor belt support may be extended.

7. A demountable conveyor support adaptable for supporting a multiplicity of upper and lower idlers, comprising, in combination; a first and a second truss side panel; a multiplicity of support plates affixed to each of said side panels in a spaced relationship with each other and substantially in the plane of the length of said truss side panels, said support plates having openings therein; demountable spacer members positioned between said first and second truss side panels in a spaced relationship with respect to each other and substantially perpendicularly to said truss and side panels; vertical plate members integrally affixed to each extremity of said spacer members disposed to engage said support plates affixed to said truss side panels, said vertical plate members having openings therein disposed to align with said openings in said support plates; fastener means inserted in said aligned openings of said support plates and said vertical plates; means on the ends of said fastener means whereby said truss side panels are drawn firmly against said spacer members; and means of demountably affixing said upper belt idlers and lower belt idlers to said truss side panels.

8. A demountable conveyor belt support according to claim 7 including means affixed to ends of said truss side panels whereby successive truss side panels may be demountably affixed thereto whereby length of said conveyor belt support may be increased.

9. A demountable conveyor belt support according to claim 7 wherein each of said spacer members comprises, a horizontal tubular member having said vertical plates perpendicularly to the tubular axis thereof at each end and wherein said openings in said vertical plates align with tubular opening of said horizontal tubular member and wherein said openings in said vertical plates are of a size substantially equal to the tubular opening of said horizontal tubular member; a bottom brace positioned substantially parallel to said horizontal tubular member and in a spaced relationship therewith; diagonal braces extending from said horizontal tubular member to said bottom brace whereby said horizontal tubular member and said bottom brace are rigidly supported in relation to each other; and means of detachably securing said bottom brace to lower portions of said truss side panels.

10. A demountable conveyor belt support according to claim 9 wherein each of said vertical plates has integrally formed therewith substantially horizontal return idler support plates whereby said return idlers may be detachably supported to the upper surface thereof; and wherein said diagonal braces extend from the lower surfaces of said return idler support plates to said bottom brace.

11. A demountable conveyor belt support according to claim 9 wherein said fastener means includes a cylindrical member disposed to enter said aligned spacer openings in said support plate and said tubular openings of said spacer members; a vertical flange affixed to one end of said cylindrical member disposed to engage said support plate affixed to one of said truss side panels, the other end of said cylindrical member having a wedge shaped slot in the plane of the cylindrical axis; and a wedge member disposed to enter said wedge shaped slot to engage said support plate of other of said truss side panels.

12. A demountable conveyor belt support according to claim 9 including truss hooks affixed to lower portion of said first and second truss side panels in a spaced relation wherein one of said truss hooks is positioned beneath each of said support plates; and spacer hooks affixed to each end of said bottom brace disposed to demountably engage said truss hooks whereby said first and second truss side panels are firmly supported in a position relative to each other.

13. A demountable conveyor support adaptable for supporting a multiplicity of upper and lower belt idlers comprising, in combination; first and second vertical members, said vertical members positioned in a spaced relationship to be substantially parallel to each other; demountable spacer means positioned between said vertical members in a spaced relationship along the length thereof; means of demountably securing said spacer means in firm engagement with said vertical members; and means of demountably affixing said upper belt idlers and said lower belt idlers to said vertical members.

References Cited in the file of this patent

UNITED STATES PATENTS

| | | |
|---|---|---|
| 1,986,071 | Ruske | Jan. 1, 1935 |
| 2,003,856 | Gimbel | June 4, 1935 |
| 2,551,374 | Hansen | May 1, 1951 |

FOREIGN PATENTS

| | | |
|---|---|---|
| 1,113,930 | France | Dec. 12, 1955 |
| 599,627 | Germany | July 6, 1934 |